United States Patent
Thompson (10) Patent No.: US 6,269,593 B1
(45) Date of Patent: Aug. 7, 2001

(54) ROOF TIE DOWN CONNECTING FORK AND YOKE

(76) Inventor: Thomas Thompson, 92-543 Kokole Pl., Makakilo, HI (US) 96707

( * ) Notice: Subject to any disclaimer, the term of this patent is extended or adjusted under 35 U.S.C. 154(b) by 0 days.

(21) Appl. No.: 09/014,213

(22) Filed: Jan. 26, 1998

(51) Int. Cl.[7] ........................................ E04D 1/34
(52) U.S. Cl. .................. 52/23; 52/4; 52/698; 52/701; 52/DIG. 11; 403/157; 403/158; 403/79
(58) Field of Search ............ 52/23, 4, 3, DIG. 11, 52/146, 698, 93.1, 93.2, 701; 403/157, 158, 79

(56) References Cited

U.S. PATENT DOCUMENTS

| | | | |
|---|---|---|---|
| 777,441 | * | 12/1904 | Small .................................... 52/23 |
| 1,093,898 | * | 4/1914 | Virtue .................................... 52/23 |
| 1,452,599 | * | 4/1923 | Hames .................................... 52/23 |
| 1,864,403 | * | 6/1932 | Bradley .................................... 52/23 |
| 2,827,317 | * | 3/1958 | Saulnier ................................ 403/157 |
| 2,967,726 | * | 1/1961 | Weston ................................ 403/157 |
| 3,309,822 | * | 3/1967 | Dunkin .................................... 52/23 |
| 3,335,531 | * | 8/1967 | Grimelli et al. ........................ 52/23 |
| 5,319,896 | * | 6/1994 | Winger .................................... 52/23 |
| 5,537,786 | * | 7/1996 | Lozier et al. ........................... 12/23 |
| 5,623,788 | * | 4/1997 | Bimberg et al. ........................ 52/23 |
| 5,687,512 | * | 11/1997 | Spoozak et al. ........................ 52/23 |

* cited by examiner

Primary Examiner—Christopher T. Kent
Assistant Examiner—Yvonne Horton-Richardson (57) ABSTRACT

A retrofit roof tie down that helps prevent the roof from separating from the gable end wall, having a fork and yoke to accommodate different roof pitches. The forks attach to pipe that holds down the roofing material and roof sheathing. A plate attaches to the gable wall securing the outside sheathing to the underlying rafter. A bolt fastens the yoke and plate together through the roof and an eye nut secures everything together. A cargo strap secures the eye to the ground.

11 Claims, 6 Drawing Sheets

TO GROUND; ANCHOR BURIED IN GROUND

ROOF TIE DOWN CONNECTING FORK AND YOKE

Related applications are Ser. Nos. 08/191,852, now abandoned and 08/578,081, now abandoned.

BACKGROUND—FIELD OF INVENTION

This invention relates to an innovative tie down that connects both pitches of a roof on a home to the foundation, especially where windows or other obstructions prevent running permanent hurricane straps to ground anchors.

BACKGROUND—DESCRIPTION OF PRIOR ART

BACKGROUND

Recent studies of hurricane damage on wood-frame buildings indicate that extensive damage was generated to a house by strong winds, when the roof rafters, roof trusses, and roof purlins twisted or were torn from the outside wall.

Roof sheathing ties all the rafters or purlins together on a wood frame house, and the roof sheathing ties all the roof a trusses together when a masonry or wood-frame house is constructed with trusses. If the rafters or trusses rack or twist from the wind forces, the roof sheathing can detach from the roof allowing rain to enter the house.

Sheathing that is tightly secured to the rafters or trusses and subsequently fastened to the walls, helps transfer uplifting forces to the walls and henceforth to the foundation. If the roof sheathing fails, the trusses collapse, and the walls usually fall down as they can not stand by themselves against strong winds.

HURRICANES

Studies of damage after Hurricane Andrew show several problems with the attachment of roof rafters and roof trusses that this invention solves.

Roof overhangs act like wings, creating huge uplifting forces during strong winds. This uplift tears apart the rafters that are toe-nailed to the header or top plate. The uplift can also twist rafters and roof trusses causing detachment.

One problem with home construction is on mis-installation of prior art hurricane clips that are made for new construction and covered by wall sheathing. After Hurricane Andrew, there were many examples of careless and inferior attachment of hurricane clips or they were entirely missing. One company has visited new construction sites and documented many examples of shoddy and incorrect application of their products.

Any uplifting wind force on the roof must be transferred to the foundation. My invention effectively ties together the roofing material, roof sheathing, and roof rafter or roof truss to the foundation, to form the most practical and economical continuous load path from the roof to the foundation.

PRIOR ART

A number of connectors have been developed to tie together the structural members of a house under construction. Up until this invention, nobody had seen how to make a connector that can be used for various-pitched roofs and be one-piece or segmented.

My co-pending application, Ser. No. 08/191,852, now abandoned, includes a retrofit hurricane clip and roof tie down. That roof tie down includes connectors that tie the roof to the rafter, and the rafter to the walls.

The leading manufacturer of wood construction connectors, the Simpson Strong-tie Company, shows no retrofit hurricane connectors in their catalog for tieing down an existing roof.

There are several retrofit apparatus for securing roofs using cables. Adams U.S. Pat. No. 5,570,545 and Winger U.S. Pat. No. 5,319,896 are both temporary, meaning a homeowner must be home to deploy and anchor the ephemeral cables. They don't protect the weak gable-end roof of a house from lifting or blowing out.

Objects and Advantages

Accordingly, several objects and advantages of my invention are that it helps secure the roof and foundation of a building to make the building a solid unit and preventing it from being destroyed by hurricanes and earthquakes.

This invention helps prevent the roof from being blown off the walls of an existing building. It keeps the roof rafters and roof trusses tightly secured to the outside sheathing and underlying top plate of the wall.

This invention helps prevent the roof rafters and roof trusses from twisting during strong winds, thereby preventing detaching of the roof material and underlying roof sheathing. It stiffens the edge of the roof and the top of the wall, helping to transfer up-lifting loads to the whole roof and walls.

Many older homes were constructed with the best materials and competent carpenters, but used the time-honored method of connecting the rafter to the top plate with nails driven into the edge of the rafter. This weak connection, called toe-nailing, is still in use today. Even if prior art hurricane clips were used in construction, the homeowner can't tell, and those clips don't hold the roof sheathing to the roof.

Mounted on the roof rafter or roof truss, my invention resists uplift, the most destructive force during a hurricane.

Still another advantage is that with the roof rafters and roof trusses better able to resist twisting, roof sheathing will stay firmly attached and roofing material will now have a better chance of staying on during strong winds and earth movements. In addition, with the sheathing now firmly connected, new materials may be attached to the roof, such as solar electric panels, without fear of them being blown off.

In areas with brush or forest fire danger, fire-proof material or heavy material, such as tile, stone or metal, can now be applied to the roof with less danger of being blown or shaken off during earth tremors or high winds.

Earth tremors and hurricanes always destroy the weakest parts of a house. By making each envelope of a house, the foundation and roof envelope into a strong unit, there will be less damage.

It is a further object of this invention that it easily, quickly, and economically protects houses from the destructive forces of hurricanes. It is a still further object that the connectors and fasteners are strong, attractive, permanent, functional, uncomplicated, simple to manufacture, easy to install, and economical. All of the embodiments can be made from a single sheet metal blank, without any welding.

A further object is that this invention can be used on various size sheathing, rafters, roof trusses, studs, wood or metal I-beams, TJI, and glue-lams, all made from wood or metal. There may be insurance discounts for homeowners who have this invention installed on their houses.

As a retrofit, a handy homeowner can install this invention, or have it installed. The homeowner can easily see that the home is protected instead of wondering if hurricane clips were installed correctly during construction, or installed at all.

Traditional toe-nailing of the rafter is at the bird's-mouth, a notch cut into the rafter where it rests on the top plate. By cutting out material from the rafter, a bird's-mouth weakens the rafter. Toe-nailing only two nails from either side grasps only a small edge of the rafter, and the nail only extends into the top 2×of the top plate.

Tests were done by the Colorado School of Mines on my co-pending retrofit hurricane clip, application Ser. No. 08/191,852. The tests showed that the rafter split lengthwise, due to uplifting force, before my 852' clip failed.

This new retrofit invention strengthens the roof to foundation connection by vastly increasing the down force on the roof.

As a retrofit, an insurance agent can observe that the home is protected and give appropriate discounts. Perspective home buyers can perceive that the building is protected, so the seller has a good selling point and can ask for a better price.

Since the roof tie down is a retrofit, and is not covered by sheathing or gypsum board, the invention is much thicker than prior hurricane clips and tensile values are dramatically increased.

Another advantage is that the roof tie down connects both slopes of a roof tied together, tremendously increasing resistance to outward thrusts. This makes the roof much stronger and able to resist more weight such as thick snow, ice, or volcanic ash, and heavy roofing material such as tile, insulated roofing, solar collectors, and satellite dishes.

This invention takes the place of a left and right prior art hurricane clip, thus cost and installation time is substantially reduced. Installation can be accomplished with a power nailer or powered screw gun.

REFERENCE NUMERALS IN DRAWINGS

| | |
|---|---|
| 1. | Hollow yoke |
| 2. | Bolt |
| 3. | Pipe |
| 4. | Wall sheathing tie |
| 5. | Washer |
| 6. | Eye nut |
| 7. | Cargo strap |
| 8. | Solid fork |
| 9. | Roofing material and roof sheathing |
| 10. | Wall sheathing tie |
| 11. | Outside wall sheathing |
| 12. | Roof rafter |
| 13. | Top part |
| 14. | Rod hole |
| 15. | Side wall |
| 16. | Fork bolt hole |
| 17. | Neck |
| 18. | Head |
| 19. | Fork bolt hole |
| 20. | Solid angle-iron fork |
| 21. | Head |
| 22. | Fork bolt hole |
| 23. | V-neck |
| 24. | Bolt hole |
| 25. | Pipe fork |
| 26. | Tine |
| 27. | Fork bolt hole |
| 28. | Head |
| 29. | Angle-iron fork |
| 30. | Tines |
| 31. | Fork bolt hole |
| 32. | V-head |
| 33. | Bolt hole |
| 34. | Solid yoke |
| 35. | Weld fork |
| 36. | Fork bolt holes |
| 37. | Fork bolt holes |
| 38. | Nob |
| 39. | Tine |
| 40. | Rod hole |
| 41. | Nail holes |
| 42. | Hollow cylinder |
| 43. | Flat plate |
| 44. | Top edge |
| 45. | Bottom edge |
| 46. | Left wall sheathing tie |
| 47 | Right sheathing tie |
| 48. | Nail holes |
| 49. | Offset cylinders |
| 50. | Loop |
| 51. | Threaded end |
| 52. | Magnetic head |
| 53. | Screw head |
| 54. | Common magnet |
| 55. | Pipe end |
| 56. | Hemispheres |
| 57. | Depressions |
| 58. | Bolt hole |
| 59. | End cap |

Description

Prior art tie-downs have neglected the weakest parts of houses, the gable end. Pictures of houses destroyed by Hurricane Andrew showed that the wind tore apart the roof from the gable end. This invention helps prevent that type of damage.

Figure 1:
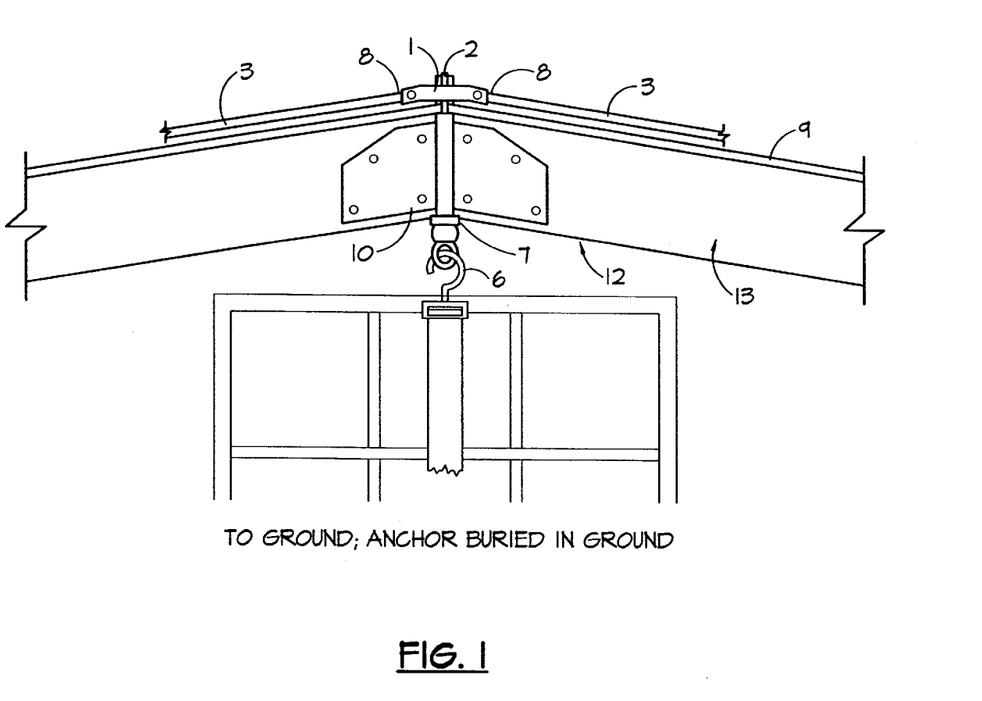
FIG. 1 shows a complete roof tie down on a house.

FIG. 1

Refer now to FIG. 1 which shows a complete roof tie down on a house. On top of the roof, a long bolt 2 holds down a hollow yoke 1. A solid fork 8 is bolted to the hollow yoke 1, and a common pipe 3 is attached to the solid fork 8, The common pipe 3 holds down the roofing material and roof sheathing 9 and can heat hot water using solar energy, similar to my co-pending patent application Ser. Nos. 08/191,852 and 08/578,081, both now abandoned.

Under the roof, a wall sheathing tie 10 is attached to the outside wall sheathing 11 and underlying roof rafter 12 or truss. The long bolt 2 from the roof pierces the wall sheathing tie 10 and is secured by an eye nut 6 and washer 5.

A hole has to be drilled through the roof for the long bolt 2, but the hole is outside of the house envelop, and no water should leak in, although silicone caulk can be installed around the hole. The roof is now permanently attached to the gable wall.

If windows or doors are in the way, or for extra security, as when a hurricane is imminent, a cargo strap 7 can be attached to the eye nut 6 and ground or foundation. The following figures will explain each part of the invention.

Figure 2A:
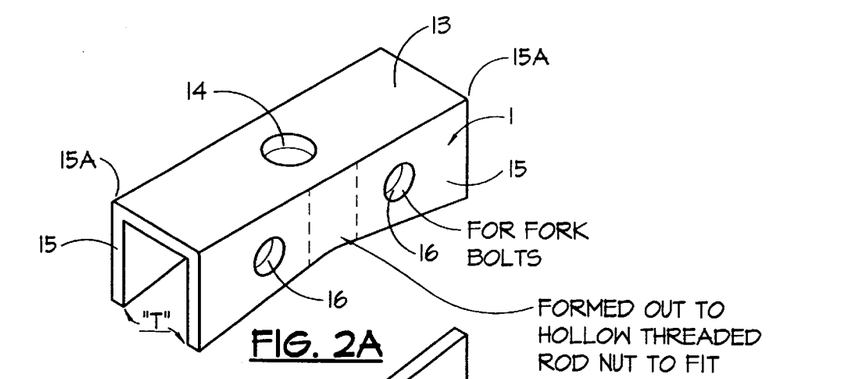
FIG. 2A is a perspective view of o hollow yoke.

FIG. 2A

Refer now to FIG. 2A which shows a perspective view of a hollow yoke 1. The top part 13 is flat with a rod hole 14 at the approximate center. The rod hole 14 accommodates the long bolt 2. The U-shaped hollow yoke 1 has two generally parallel side walls 15 bent at right angles from the top part 13 by right angle bends 15A. The side walls 15 have fork bolt holes 16, near either end, that can accommodate bolts for attachment to forks. The side walls 15 are formed out to allow a long bolt 2 to pass, and are angled to accommodate the roof peak.

Figure 2B:
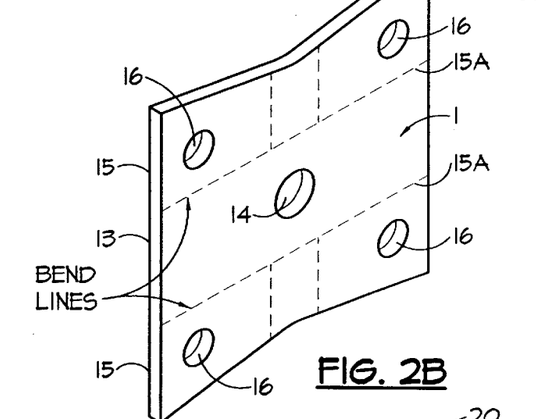
FIG. 2B is a flat pattern layout of a hollow yoke.

FIG. 2B

Refer now to FIG. 2B which shows a flat pattern layout for a hollow yoke 1. Shown after the fork bolt holes 16 and rod hole 14 have been punched, but prior to bending ar right angle bends 15A.

Figure 3A:
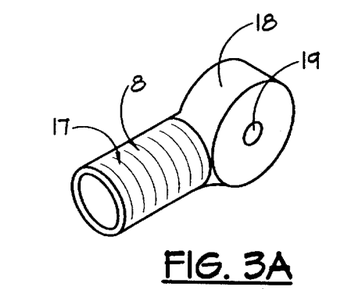
FIG. 3A shows a solid fork.

FIG. 3A

Refer now to FIG. 3A which shows a solid fork 8 that is banjo-shaped. The neck 17 of the solid fork 8 has standard threads for screwing into pipe 3. The head 18 is cylinder-shaped with a fork bolt hole 19. The head 18 has a thickness that allows it to fit between the side walls 15 of a hollow yoke 1. The head 18 also has a diameter to allow rotation when a bolt is inserted through the fork bolt hole 16 of the hollow yoke 1 and fork bolt hole 19 of the solid fork 8. This rotation allows the solid fork 8 and hollow yoke 1 to accommodate roof pitches of any slope.

Figures 3B, 3C:
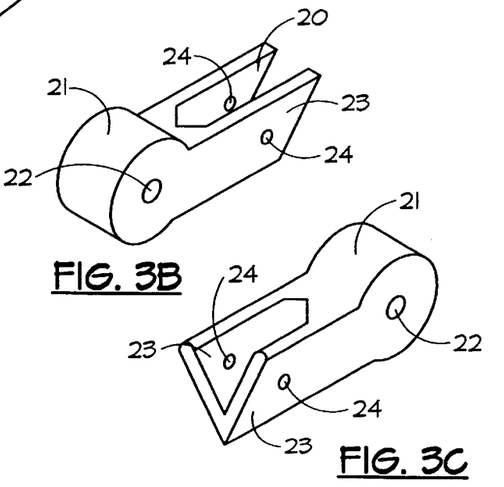
FIG. 3B shows a perspective view of a solid angle-iron fork.
FIG. 3C shows a perspective view of an angle-iron fork.
Figure 3D:
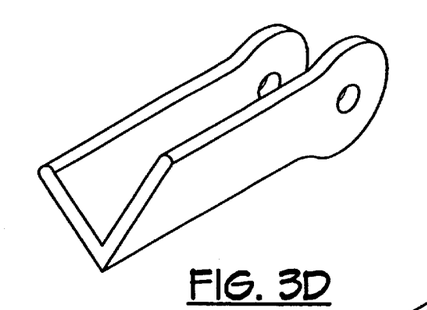
FIG. 3D shows a perspective view of an angle-iron fork without the bolt holes.
Figure 3E:
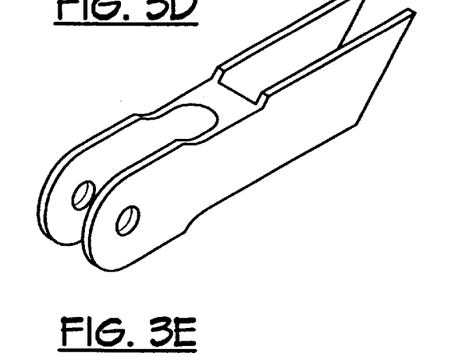
FIG. 3E shows a perspective view of an angle-iron fork without the bolt holes.
Figure 3F:
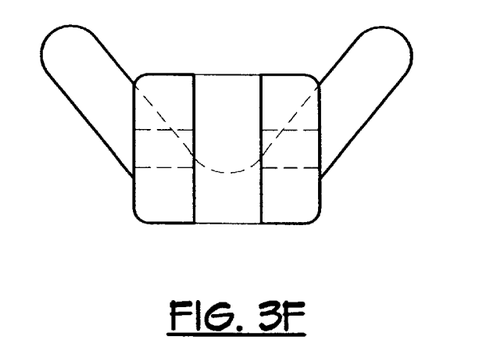
FIG. 3F shows a rear view of an angle-iron fork without the bolt holes.

FIG. 3B

Refer now to FIG. 3B which shows a perspective view of a solid angle-iron fork 20. The head 21 has the same dimensions as the head 18 of a solid fork 8, including a fork bolt hole 22. The V-neck 23 has a V-shape, the same dimension as standard angle-iron. Bolt holes 24 allow the V-neck 23 to be attached to angle-iron that holds down a solar hot water heater and roof similar to FIG. 1.

FIG. 3C

Refer now to FIG. 3C which shows a perspective view of a solid angle-iron fork 20 from the angle-iron end. Shown is the right angle formed by the V-necks 23. The solid fork 8 and solid angle-iron fork 20 can be stamped, forged, molded or machined by standard methods.

Figure 4A:
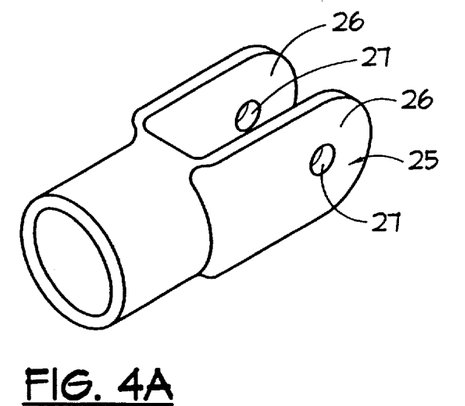
FIG. 4A shows a perspective view of a pipe fork.

FIG. 4A

Refer now to FIG. 4A which shows a perspective view of a pipe fork 25. The pipe fork 25 is similar to a solid fork 8 except that the tines 26 go on the outside of the side walls 15 of a hollow yoke 1. The distance between each parallel tine 26 allows the tines 26 to fit on the outside of the side walls 15. A bolt through the fork bolt holes 27 on the tines 26 will attach the pipe fork 25 to the fork bolt holes 16 of the hollow yoke 1. The bolt will allow the pipe fork 25 to rotate for any pitch roof.

The head 28 can have inner or outer threads or can be slip-fit or welded to the pipe 3.

Figure 4B:
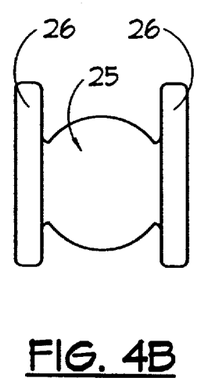
FIG. 4B shows a rear view of a pipe fork.

FIG. 4B

Refer now to FIG. 4B which shows a rear view of a pipe fork 25 showing the parallel tines 26.

Figure 4C:
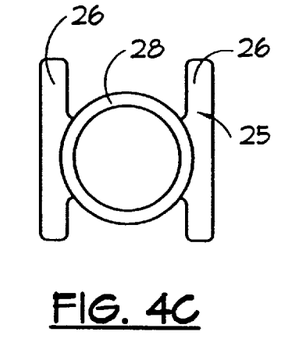
FIG. 4C shows a front view of a pipe fork.

FIG. 4C

Refer now to FIG. 4C which shows a front view of a pipe fork 25 showing the head 28.

Figure 4D:
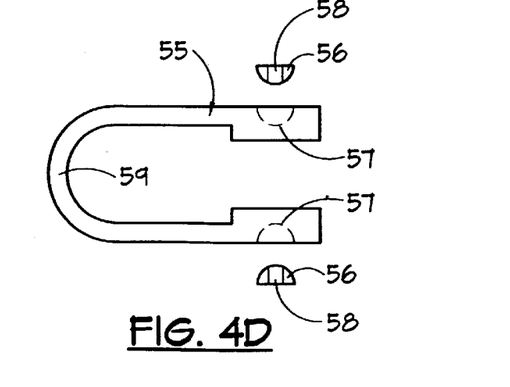
FIG. 4D shows an end view of a pipe end.

FIG. 4D

Refer now to FIG. 4D which shows a pipe end 55 used to secure pipe 3 at the ends. Hemispheres 56 fit into depressions 57 allowing bolts to enter through bolt holes 58 at different angles. Tightening the bolts will squeeze the depressions 57 toward each other clamping the end cap 59 against the pipe 3. The depressions 57 allow the hemispheres 56 to pivot for use on any slope roof.

Figures 5A, 5B:
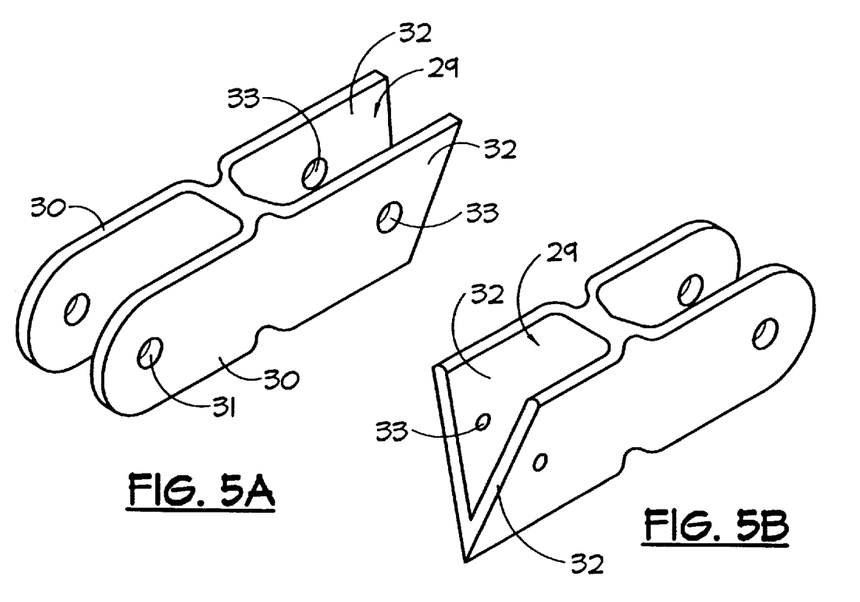
FIG. 5A shows a perspective view of a angle-iron fork.
FIG. 5B shows a perspective view of a angle-iron fork.

FIG. 5A

Refer now to FIG. 5A which shows a perspective view of an angle-iron fork 29. The angle-iron fork 29 is similar to a pipe fork 25, because the tines 30 and fork bolt hole 31 are the same as the tines 26 and fork bolt hole 27 on a pipe fork 25. The V-head 32, with bolt hole 33, is the same as the V-neck 23 and bolt hole 24 on a solid angle-iron fork 20.

FIG. 5B

Refer now to FIG. 5B which shows a perspective view of an angle-iron fork 29 from the V-head 32 end. This shows how angle-iron can lay in the V-head 32.

Figure 6A:
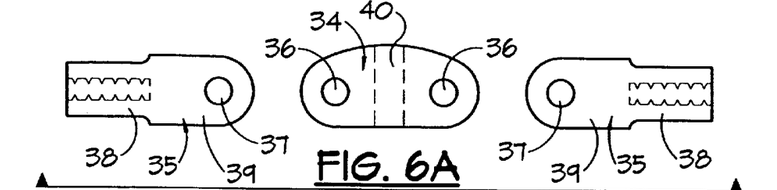
FIG. 6A shows a side view of a solid yoke.

FIG. 6A

Refer now to FIG. 6A which shows a side view of a solid yoke 34 about to become attached to weld forks 35. The solid yoke 34 has fork bolt holes 36 that will line up with fork bolt holes 37 of the weld forks 35. The tines 39 envelop the edges of the solid yoke 34. A bolt and nut will secure each piece on a roof similar to the hollow yoke 1 and solid fork 8 shown in FIG. 1. The nob 38 is threaded or welded to the pipe 3. When attached together, the solid yoke 34 and weld fork 35 can fit on the roof peak of any slope roof. The invention can be used at roof valleys where the roof tie down is installed upside-down.

Figure 6B:
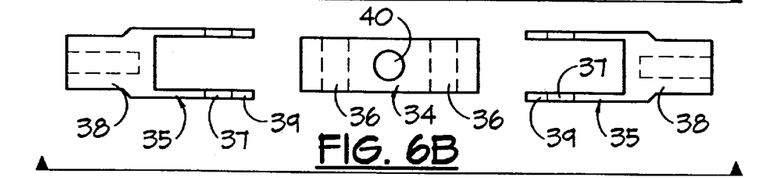
FIG. 6B shows a top view of a solid yoke.

FIG. 6B

Refer now to FIG. 6B which shows a top view of a solid yoke 34 about to become attached to weld forks 35. This view shows how everything will line up and attach together with bolts through the fork bolt holes 36 and 37. A long bolt 2 threads down through the rod hole 40.

Figure 6C:
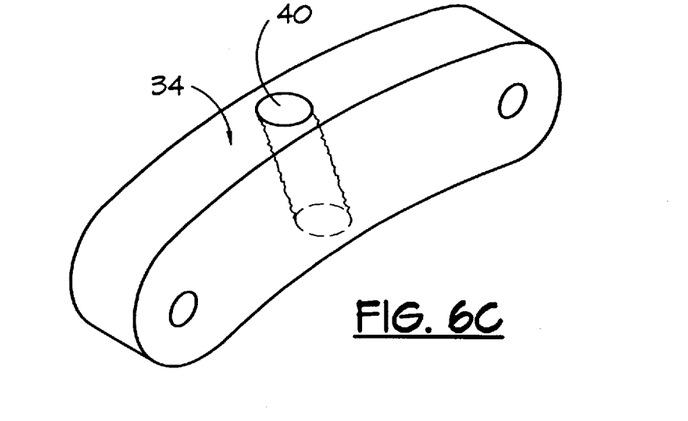
FIG. 6C shows a perspective view of a solid yoke.

FIG. 6C

Refer now to FIG. 6C which shows a perspective view of a solid yoke 34. The rod hole 40 can be formed with threads so a threaded rod can be inserted from below and a nut would not be needed on top of the roof.

Figure 7A:
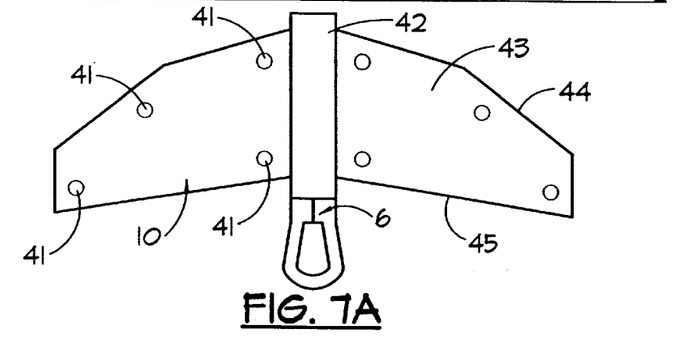
FIG. 7A shows a front view of a wall sheathing tie.

FIG. 7A

Refer now to FIG. 7A which shows a front view of a wall sheathing tie 10, similar to my roof tie down in my co-pending application Ser. No. 08/191,852. The nail holes 41 are for attachment to the outside wall sheathing 11 and underlying rafter 12 by nails or screws. The hollow cylinder 42 is attached to the flat plate 43 of the wall sheathing tie 10. The top edge 44 and bottom edge 45 are angled to follow the slope of any pitch roof. A long bolt 2 fits through the hollow cylinder 42 and is secured by an eye nut 6.

Figure 7B:
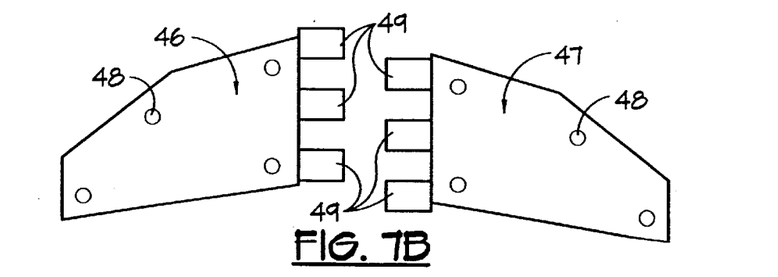
FIG. 7B shows the front view of a left and right wall sheathing tie.

FIG. 7B

Refer now to FIG. 7B which shows the front view of a left wall sheathing tie 46 and right wall sheathing tie 47 prior to attachment to a house. The left and right wall sheathing ties 46 and 47 can be used individually or together. Both have nail holes 48 and offset cylinders 49 for a long bolt 2.

Figure 7C:
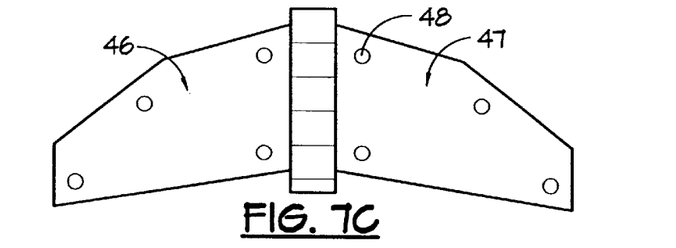
FIG. 7C shows a left and right wall sheathing tie together.

FIG. 7C

Refer now to FIG. 7C which shows a left wall sheathing tie 46 and right wall sheathing tie 47 with their offset cylinders 49 locked together and installed on a house.

Figure 8:
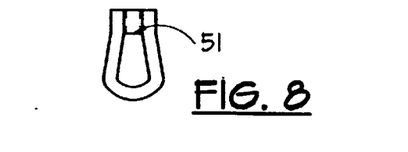
FIG. 8 shows an eye nut.

FIG. 8

Refer now to FIG. 8 which shows an eye nut 6 with loop 50, for attachment to a cargo strap 7, and threaded end for screwing onto a long bolt 2.

Figure 9A:
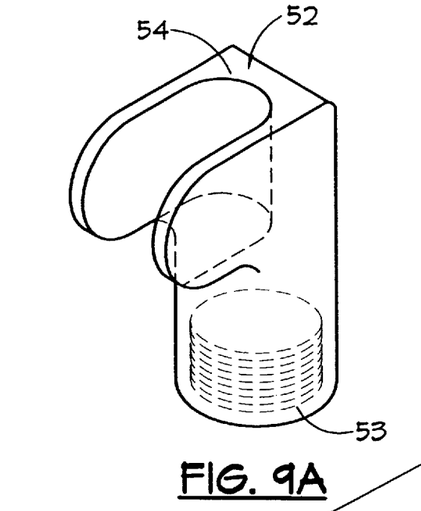
FIG. 9A shows a magnetic head.

FIG. 9A

Refer now to FIG. 9A which shows a magnetic head 52 with screw head 53. The magnetic head 52 has a common magnet 54 inserted in the top, and screw head 53 on the bottom. The magnet can be easily changed.

Figure 9B:
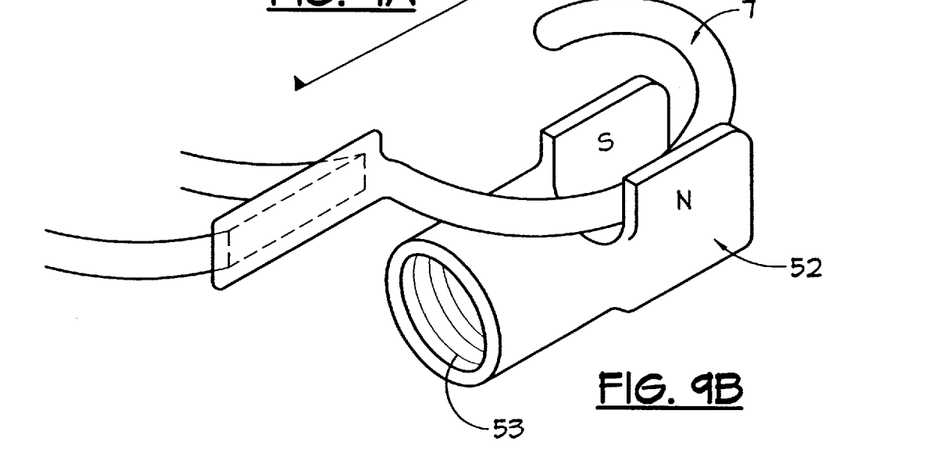
FIG. 9B shows a magnetic head and cargo strap.
Figure 9C:
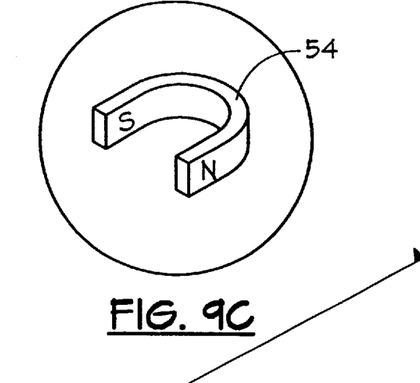

FIG. 9B

Refer now to FIG. 9B which shows a magnetic head 52 magnetized to a hook of a cargo strap 7. A long pole with a screw end can be screwed into the screw head 53 and the magnetic head 52 can be used from the ground to safely install the cargo strap 7 from the foundation to the eye nut 6.

Conclusion, Ramifications, and Scope of Invention

The roof tie down is a true retrofit that helps protect a house from the effects of hurricanes and tornadoes. The roof tie down holds the roof securely to the outside wall. The roof tie down helps prevent a roof rafter from lifting, twisting, moving in toward the house, moving out from the house, moving to the left, and moving to the right.

The roof tie down also holds the outside wall sheathing on the gable end securely to the wall. The roof tie down helps prevent the outside sheathing from bowing out, bowing in, separating from the wall, riding over each other, and splitting.

The stealth clip turns the outside wall into a strong shear-wall and prevents the wall from racking.

Thus the reader can see that the hurricane and tornado connectors of this invention are unique, strong, permanent, functional, and necessary. They are also simple and economical to make, requiring simple tool and dies and no welding.

This invention solves the problem of retro-fitting houses to minimize high wind dangers by using an ingenious and practical connector. Many homeowners stay in their house during hurricanes, because they do not want to be caught in traffic jams trying to escape the fury, they live on a small island, or they are caught unaware.

While my above description contains many specificities, these should not be construed as limitations on the scope of the invention, but rather as an exemplification of one preferred embodiment thereof. Many other variations are possible.

For example, since the connectors are on the outside of a building, the shape can be changed slightly to make them more architecturally appealing on certain types of houses. To fit on some architectural styles of houses, the shape can be changed slightly without comprising the structural integrity of the clip. The thickness of the connector can be altered slightly, or have beveled edges or chamfer.

Rubber, plastic, foam, or resilient pads could be inserted between the connector and the outside sheathing. This would help absorb earthquake forces without cracking, and deaden the shocks, and after-shocks.

The roof sheathing ties could have a rubber washer, O-ring, or silicone seal where it goes through the roof in order to make the connection water-proof. This will allow the tie to hold roof sheathing to the rafter, without letting water into the house. The tie could use this rubber to reduce loading and deaden shocks from a seismic event.

The invention could use different manufacturing techniques including manipulated sheet metal, casting, forging, extrusion, and plastic molds or injection. There can also be minor variations in color, size, and materials.

This invention was over-designed in order to exceed building codes in force or any that can be anticipated. Many areas have no codes for retrofit's because, prior to this invention, there were no workable ties that could be retrofit to most buildings. Lag bolts, nails, screws, or bolts and washers could be used to fasten the connectors to the house.

I claim:

1. A permanent system for securing a building against high winds including a pitched roof structure with a gable end forming a ridge line comprising:
   a) a yoke adapted to be secured around the ride line of the pitched roof;
   b) forks for pivoting on either end of said yoke;
   c) a pipe for attachment to said forks;
   d) a sheathing tie adapted to be attached to the gable end of said building; and
   e) a nut, bolt, and washer for securing said sheathing tie to said yoke.

2. A system as in claim 1 wherein said yoke has a rectangular shape and a plurality of holes on either end approximately parallel to said roof for receiving said forks.

3. A system as in claim 1 wherein said forks have an attachment hole on one end as a means for attaching and pivoting approximately parallel to said roof pitch.

4. A system as in claim 1 wherein said forks have a diameter and threaded ends opposite said attachment hole as a means for attachment to said pipe.

5. A system as in claim 1 wherein said pipe has a diameter and threads for attachment to said fork.

6. A system as in claim 1 wherein said sheathing tie has a generally flat face and a plurality of nail holes adapted to be attached to an outside sheathing and underlying rafter or roof truss of said gable end.

7. A system as in claim 2 wherein said yoke has a bolt hole in the approximate center, generally perpendicular to said attachment holes for accommodating said bolt from the top of the roof.

8. A system as in claim 4 wherein said forks have a V-shape and a plurality of bolt holes as a means for attachment to an angle iron.

9. A system according to claim 5 or 7 wherein said pipe and said angle iron are used to hold down roofing material and roof sheathing against high winds.

10. A system as in claim 6 wherein said sheathing tie has vertical pipe-shaped bolt holes parallel to said gable wall as a means for receiving said bolt from said yoke through the roofing material and the roof sheathing.

11. A system as in claim 10 wherein said nut and washer are tightened onto said bolt as a means of securing said roof to said gable wall thereby preventing uplift during strong winds and preventing said gable end wall from bowing or blowing out from negative pressure of hurricane force winds.

* * * * *